(12) United States Patent
Liu et al.

(10) Patent No.: US 12,247,856 B2
(45) Date of Patent: Mar. 11, 2025

(54) MICRO-DISPLACEMENT MEASUREMENT SYSTEM HAVING PICOMETER SCALE RESOLUTION AND MEASUREMENT METHOD

(71) Applicant: HEFEI UNIVERSITY OF TECHNOLOGY, Anhui (CN)

(72) Inventors: Fangfang Liu, Anhui (CN); Xinyang Liu, Anhui (CN); Wei Zhou, Anhui (CN); Xin Ran, Anhui (CN); Hongli Li, Anhui (CN); Haojie Xia, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 0 days.

(21) Appl. No.: 18/280,240

(22) PCT Filed: Jul. 5, 2022

(86) PCT No.: PCT/CN2022/103948
§ 371 (c)(1),
(2) Date: Sep. 4, 2023

(87) PCT Pub. No.: WO2023/284592
PCT Pub. Date: Jan. 19, 2023

(65) Prior Publication Data
US 2024/0151558 A1    May 9, 2024

(30) Foreign Application Priority Data

Jul. 16, 2021 (CN) .......................... 202110805145.9
Jul. 16, 2021 (CN) .......................... 202110805151.4

(51) Int. Cl.
*G01D 5/353* (2006.01)
*G01B 11/14* (2006.01)

(52) U.S. Cl.
CPC ......... *G01D 5/35316* (2013.01); *G01B 11/14* (2013.01)

(58) Field of Classification Search
CPC .. G01D 5/35316; G01B 11/14; G01B 11/007; G01B 11/026
See application file for complete search history.

(56) References Cited

U.S. PATENT DOCUMENTS

2017/0363417 A1    12/2017   Cui et al.

FOREIGN PATENT DOCUMENTS

| CN | 103278098 | 9/2013 |
| CN | 111879450 | 11/2020 |

(Continued)

OTHER PUBLICATIONS

CN103278098 English Translation (Year: 2013).*

(Continued)

*Primary Examiner* — Tarifur R Chowdhury
*Assistant Examiner* — Kaitlyn E Kidwell
(74) *Attorney, Agent, or Firm* — JCIPRNET

(57) ABSTRACT

A micro-displacement measurement system having a picometer scale resolution and a measurement method. The measurement system comprises a probe module, a demodulation optical path module, a static lock-in amplification module, an upper computer module, and a micro-displacement drive module. The probe module comprises a measurement FBG sensor, a matching FBG sensor, a precision stainless steel needle tube, and an external support; the demodulation optical path module comprises an ASE broadband light source, a first circulator, a second circulator, and an InGaAs photodetector; the upper computer module comprises a data acquisition card and a computer; and the micro-displacement drive module comprises a piezoelectric ceramic nano- (Continued)

positioner, a piezoelectric ceramic driver, a three-dimensional precision micro-motion platform.

2 Claims, 7 Drawing Sheets

(56) References Cited

FOREIGN PATENT DOCUMENTS

| | | |
|---|---|---|
| CN | 111879451 | 11/2020 |
| CN | 113532285 | 10/2021 |
| CN | 113532492 | 10/2021 |

OTHER PUBLICATIONS

CN111879450 English Translation (Year: 2020).*
Jia Zhen-An et al., "Demodulation Electric Circuit of Optical Fiber Grating Weak Signal Detection", Instrument Technique and Sensor, submit with English abstract, Feb. 2012, pp. 79-81.
"International Search Report (Form PCT/ISA/210) of PCT/CN2022/103948," mailed on Sep. 26, 2022, with English translation thereof, pp. 1-5.
"Written Opinion of the International Searching Authority (Form PCT/ISA/237) of PCT/CN2022/103948," mailed on Sep. 26, 2022, pp. 1-5.

* cited by examiner

MICRO-DISPLACEMENT MEASUREMENT SYSTEM HAVING PICOMETER SCALE RESOLUTION AND MEASUREMENT METHOD

CROSS-REFERENCE TO RELATED APPLICATION

This application is a 371 of international application of PCT application serial no. PCT/CN2022/103948, filed on Jul. 5, 2022, which claims the priority benefit of China application no. 202110805145.9, filed on Jul. 16, 2021 and China application no. 202110805151.4, filed on Jul. 16, 2021. The entirety of each of the above mentioned patent applications is hereby incorporated by reference herein and made a part of this specification.

BACKGROUND

Technical Field

The disclosure relates to the field of micro-nano measurement, and more specifically, relates to a micro-displacement measurement system having a picometer scale resolution and a measurement method.

Description of Related Art

Micro-nano ultra-precision detection technology ensures the precise processing and assembly of micro devices, and it is also the premise and basis for the development of nano-processing technology. Coordinate measuring machines are used most of the time to precisely measure the three-dimensional dimensions of some devices. In order to measure micro devices, various micro probes and sensing principles have been developed to provide measurement systems with nanoscale precision. Its measuring force is small, and the diameter of a micro probe can reach the order of microns or nanometers.

The fiber Bragg grating (FBG) is a new type of passive optical sensor, and it has the advantages of small structure size, high measurement sensitivity, large linear measurement range, good anti-interference, high reliability, etc., so it has been widely used in many fields. Based on its sensing principle, at present, the research and applications of FBGs is mainly reflected in the study of FBG-related spectral information and the measurement of actual parameters. By taking the advantage of photosensitivity of common optical fiber materials, that is, a permanent change in the refractive index caused by the interaction between external incident photons and germanium ions inside the fiber core, a spatial phase grating is formed inside the fiber core of an FBG. Its function is essentially to form a narrow-band filter or transmitter inside the fiber core, that is, to reflect or attenuate light of a specific wavelength, so FBG is usually called a fiber grating. At present, since the resolution of the micro-nano measurement system of the FBG probe is mostly in the range of ten to tens of nanometers, with the development of nanotechnology and precision of micro-device manufacturing, the requirements for the resolution of the micro-nano measurement system will increase and will even reach the scale of picometers.

SUMMARY

In order to address the deficiencies found in the related art, the disclosure provides a micro-displacement measurement system having a picometer scale resolution and a measurement method aiming to obtain a reliable optical power voltage signal following the micro-displacement change and to establish a voltage-output displacement curve of a piezoelectric ceramic nano-positioner, so as to achieve the recognition and detection of micro-displacement smaller than the nanometer scale.

To achieve the above, the following technical solutions are adopted in the disclosure.

A micro-displacement measurement system having a picometer scale resolution includes a probe module, a demodulation optical path module, a static lock-in amplification module, an upper computer module, and a micro-displacement drive module.

The probe module includes a measurement FBG sensor, a matching FBG sensor, a precision stainless steel needle tube, and an external support.

The precision stainless steel needle tube is clamped on the external support. The measurement FBG sensor and the matching FBG sensor are packaged side by side in the precision stainless steel needle tube, and a distance from a fiber end surface of the measurement FBG sensor to a bottom portion of the precision stainless steel needle tube is less than a distance from a fiber end surface of the matching FBG sensor to the bottom portion of the precision stainless steel needle tube, so that a dual FBG self-compensating demodulation structure is formed. The measurement FBG sensor and the matching FBG sensor are both single-mode FBGs and have Bragg center wavelengths of 1549.949 nm and 1549.963 nm respectively, 3 dB bandwidths of 0.134 nm and 0.132 nm respectively, and grating lengths of 15 mm. A difference between the Bragg center wavelengths of the two FBGs is merely 0.014 nm.

The demodulation optical path module includes an ASE broadband light source, a first circulator, a second circulator, and an InGaAs photodetector.

An input end of the first circulator is connected to the ASE broadband light source, and an output end of the first circulator is connected to the measurement FBG sensor. An input end of the second circulator is connected to a reflection end of the first circulator, and an output end of the second circulator is connected to the matching FBG sensor. A reflection end of the second circulator is connected to an input end of the InGaAs photodetector. The first circulator and the second circulator are both 1×2 type circulators and have operating wavelengths of 1550 nm, insertion loss of 0.80 dB and 0.63 dB respectively, and return loss≥55 dB.

An output end of the InGaAs photodetector is connected to the static lock-in amplification module.

The upper computer module includes: a data acquisition card and a computer.

An output signal of the static lock-in amplification module is transmitted to the computer through the data acquisition card.

The micro-displacement drive module includes a piezoelectric ceramic nano-positioner, a piezoelectric ceramic driver, and a three-dimensional precision micro-motion platform. The piezoelectric ceramic nano-positioner has a closed-loop stroke of 2 µm, a repeatability of 0.7 nm, and a resolution of 0.03 nm.

An input end of the piezoelectric ceramic driver is connected to the computer, an output end of the piezoelectric ceramic driver (13) is connected to the piezoelectric ceramic nano-positioner. The piezoelectric ceramic nano-positioner is fixed onto the three-dimensional precision micro-motion platform.

Laser light emitted by the ASE broadband light source is transmitted into the measurement FBG sensor through the first circulator. First reflected light after the measurement FBG sensor reflects the laser light reaches the input end of the second circulator and is transmitted into the matching FBG sensor by the second circulator. Second reflected light after the matching FBG sensor reflects the first reflected light enters the InGaAs photodetector. An optical power voltage signal is outputted by the InGaAs photodetector, transmitted to the static lock-in amplification module for processing, and then transmitted into the computer through the data acquisition card. Herein, the optical power voltage signal is proportional to a spectral overlapping area of the measurement FBG sensor and the matching FBG sensor.

The disclosure further provides a measurement method of the micro-displacement measurement system having the picometer scale resolution, and the measurement method is implemented according to the following steps.

In step 1, the ASE broadband light source is preheated and the piezoelectric ceramic nano-positioner is adjusted, so that an upper end surface of the piezoelectric ceramic nano-positioner is aligned with a top portion of the measurement FBG sensor.

In step 2, the measurement FBG sensor is fixed, a step amount of the three-dimensional precision micro-motion platform is adjusted to a micron scale, the three-dimensional precision micro-motion platform gradually approaches the top portion of the measurement FBG sensor according to the step amount, and the adjustment of the three-dimensional precision micro-motion platform is stopped when a distance between the two enters a full-scale range of measurement.

In step 3, the computer controls the piezoelectric ceramic driver to continuously output piezoelectric signals to drive the piezoelectric ceramic nano-positioner to step according to a nanoscale step amount, and in the stepping process, the top portion of the measurement FBG sensor is in contact with the upper end surface of the piezoelectric ceramic nano-positioner step by step, so that the optical power voltage signal outputted by the InGaAs photodetector continues to produce corresponding changes, and the data acquisition card synchronously collects the optical power voltage signal processed by the static lock-in amplification module and transmits it to the computer.

In step 4, the computer performs averaging and least square fitting processing on the received processed optical power voltage signals in the stepping process, establishes a piezoelectric ceramic nano-positioner output displacement curve, and completes the measurement of micro-displacement.

Compared to the related art, the beneficial effects of the disclosure include the following.

1. Safety precautions and methods related to the technology of the micro-displacement measurement system having the picometer scale resolution are provided in the disclosure, including the selection and coordination of high-precision and high-sensitivity equipment and devices, as well as the application of dual FBG self-compensating demodulation structures. A dynamic dual-grating self-compensating method is designed to achieve high-sensitivity and high-precision demodulation of FBG wavelength drift, the structure is simple, and favorable anti-interference performance is provided. This method is improved on the basis of a matched filter method combined with practice. Circulators are used after the broadband light source to prevent the interference of the returning light, and a photodetector is used at the same time to characterize the drift of the wavelength with the power intensity.

2. The measurement method of micro-displacement having the picometer scale resolution is provided the disclosure. That is, the voltage-output displacement curve of the piezoelectric ceramic nano-positioner is established through the optical power voltage signal processed by the static lock-in amplification module, and the detection of micro-displacement smaller than the nanometer scale can be simply and directly achieved.

3. The micro-nano measurement system with the fiber Bragg grating as the sensitive element is designed in the disclosure, so the resolution of micro-displacement detection can reach picometer scale. Further, high sensitivity and low noise level are provided, and the robustness against interference of the measurement environment is strong. Therefore, the micro-displacement measurement exhibiting high sensitivity and ultra-high resolution can be achieved with strong anti-interference and good repeatability, and the costs are low.

DESCRIPTION OF THE EMBODIMENTS

Figure 1:
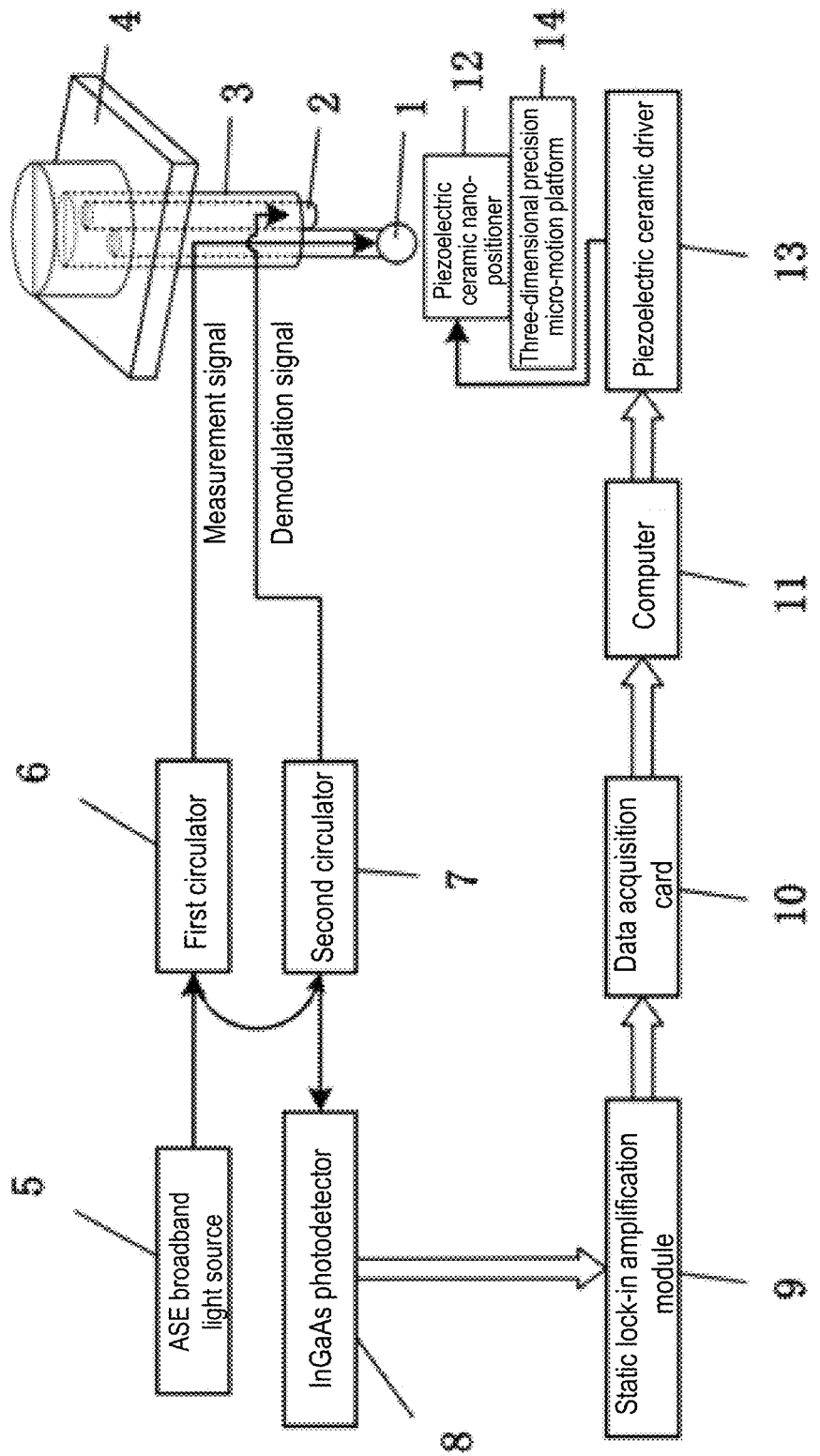
FIG. 1 is a schematic structural view of a measurement system.

In this embodiment, a micro-displacement measurement system having a picometer scale resolution uses a fiber Bragg grating as a sensitive element, and a dual FBG self-compensating demodulation structure is applied, so high sensitivity is achieved, and the amount of FBG wavelength drift is also demodulated with high precision. The structure is simple and has good anti-interference performance. Further, the static lock-in amplification technology is adopted in the structure, so that the signal-to-noise ratio of the system is significantly improved. The system structure is shown in FIG. 1.

A micro-displacement measurement system includes a probe module, a demodulation optical path module, a static lock-in amplification module, an upper computer module, and a micro-displacement drive module.

The probe module includes a measurement FBG sensor 1, a matching FBG sensor 2, a precision stainless steel needle tube 3, and an external support 4.

The precision stainless steel needle tube 3 is clamped on the external support 4. The measurement FBG sensor 1 and the matching FBG sensor 2 are packaged side by side in the precision stainless steel needle tube 3, and a distance from a fiber end surface of the measurement FBG sensor 1 to a bottom portion of the precision stainless steel needle tube 3 is less than a distance from a fiber end surface of the matching FBG sensor 2 to the bottom portion of the precision stainless steel needle tube 3, so that a dual FBG self-compensating demodulation structure is formed.

An output end of the InGaAs photodetector (8) is connected to the static lock-in amplification module 9. An output of the static lock-in amplification module is transmitted to the computer 11 through the data acquisition card 10. Laser light emitted by the ASE broadband light source 5 is transmitted into the measurement FBG sensor 1 through the first circulator 6. First reflected light after the measurement FBG sensor 1 reflects the laser light reaches the input end of the second circulator 7 and is transmitted into the matching FBG sensor 2 by the second circulator 7, second reflected light after the matching FBG sensor 2 reflects the first reflected light enters the InGaAs photodetector 8. An optical power voltage signal is outputted by the InGaAs photodetector 8, transmitted to the static lock-in amplification module for processing, and then transmitted into the computer 11 through the data acquisition card 10. Herein, the optical power voltage signal is proportional to a spectral overlapping area of the measurement FBG sensor 1 and the matching FBG sensor 2.

In this element, the sensing principle of the sensing element and the measurement FBG sensor can be briefly described as that part of the narrow-band spectrum corresponding to its center wavelength is reflected back, and the rest is transmitted. The center wavelength of FBG is a function of grating refractive index and grating period, which can be expressed as formula (1):

$$\lambda = 2n_{\text{eff}}\Lambda \tag{1}$$

In formula (1): $\lambda$ is the center wavelength of the grating, $\Lambda$ is the grating period of the FBG, and $n_{\text{eff}}$ is the effective refractive index of the fiber core. As the temperature and strain change, the grating period $\Lambda$ of the FBG and the effective refraction $n_{\text{eff}}$ of the fiber core will change, causing the drift of the center wavelength $\lambda$. The drift of the center wavelength can be measured by demodulation, and the drift of the center wavelength caused by strain and temperature can be expressed as formula (2):

$$\frac{\Delta\lambda}{\lambda} = \frac{\Delta n_{\text{eff}}}{n_{\text{eff}}} + \frac{\Delta\Lambda}{\Lambda} = (1-p_e)\varepsilon_x + (\alpha+\xi)\Delta T \tag{2}$$

In formula (2):

$$p_e = \frac{(n_{\text{eff}})^2}{2}[p_{12} - v(p_{11} + p_{12})] \approx 0.22$$

is the elastic-optical coefficient, $p_{ij}$ is the Pockels coefficient, $v$ is Poisson's ratio, $\varepsilon_x$ is the axial strain, $\alpha$ is the thermal expansion coefficient, $\xi$ is the thermo-optic coefficient, and $\Delta T$ is the temperature variable. Therefore, it can be seen that when FBG is used as a sensing element, the influence of strain and temperature on its sensing must be considered at the same time.

Assuming that the temperature change does not cause the drift of the center wavelength, its relationship with the strain can be expressed as formula (3):

$$\frac{\Delta\lambda}{\lambda} = (1-p_e)\varepsilon_x \tag{3}$$

In this embodiment, the measurement FBG sensor and the matching FBG sensor are both SMF-28 single-mode fibers and have Bragg center wavelengths of 1549.949 nm and 1549.963 nm respectively, 3 dB bandwidths of 0.134 nm and 0.132 nm respectively, and grating lengths of 15 mm. A difference between the Bragg center wavelengths of the two FBGs is merely 0.014 pm, that is, the overlapping area of the reflected light spectra of the two FBGs is relatively large, so the sensitivity of the measurement system is relatively high. The dual FBG self-compensating demodulation structure is used to demodulate the drift of the FBG center wavelength in the disclosure, and the matching FBG sensor and the measurement FBG sensor are in the same temperature field. Therefore, changes in temperature and other factors cause the center wavelengths of the two FBG sensors to drift equally in the same direction, and error self-compensation for common-mode interference is thus achieved.

Figure 2:
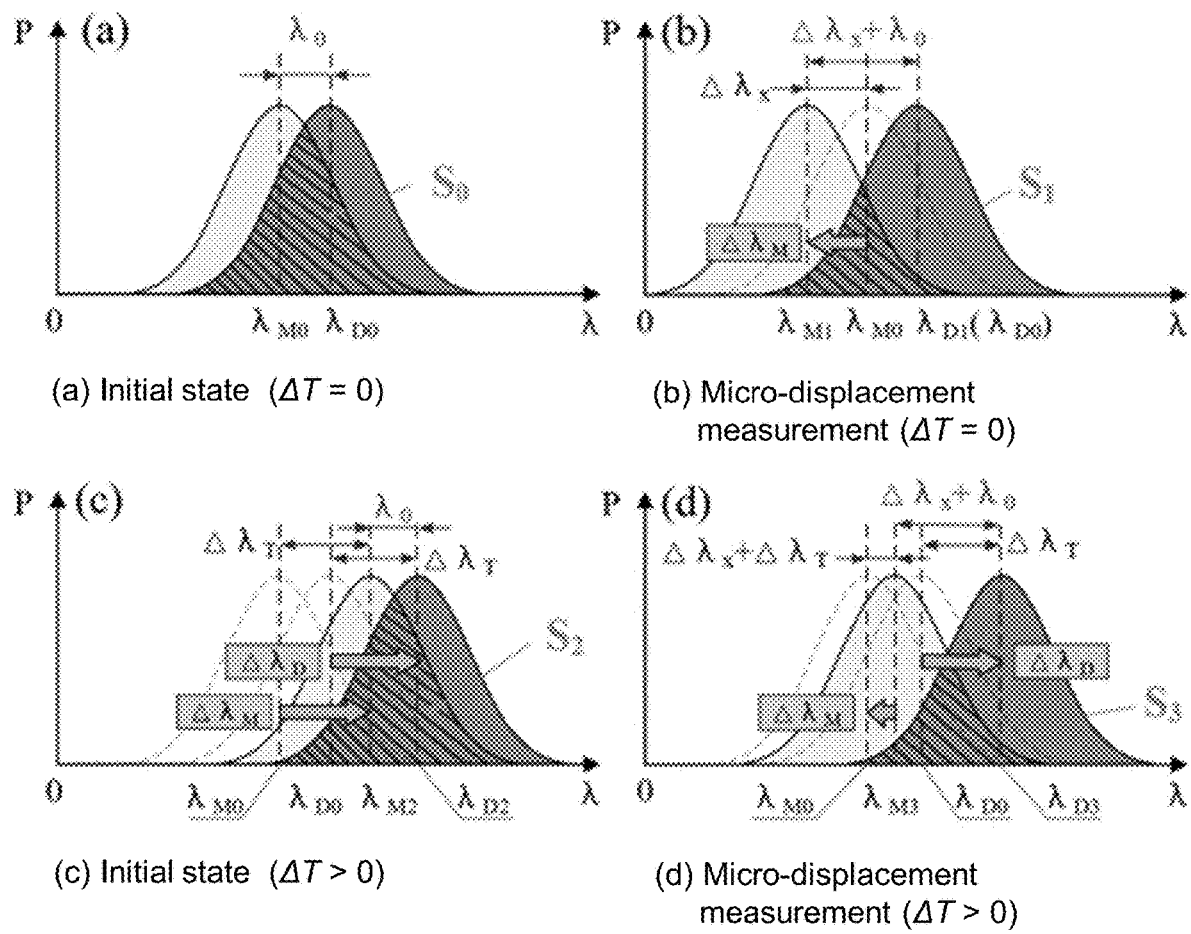
FIG. 2 is a graph is a principle of a dual grating self-compensation method.

In this micro-displacement measurement system, a dual FBG self-compensating demodulation structure and method are designed to weaken the influence of ambient temperature on the probe system. FIG. 2 is a graph illustrating a principle of a spectral relationship in a dual grating self-compensation method. In the initial state, when the ambient temperature does not change ($\Delta T=0$), due to the good consistency of the two FBG parameters, the spectral overlapping area $S_0$ is the largest, that is, the light energy P received by the detector is the largest (as shown in (a) of FIG. 2). In (b) of FIG. 2, when the micro-displacement measurement is performed ($\Delta T=0$ and $\varepsilon_x<0$), the center wavelength $\lambda_M$ of the measured FBG is displaced by $\Delta\lambda_x$, and the center wavelength $\lambda_D$ of the demodulated FBG remains unchanged, so the wavelength difference is $\Delta\lambda_x+\lambda_0$. Therefore, the reflection spectra of the two FBGs are staggered, and the spectral overlapping area $S_1<S_0$, the light energy received by the detector is correspondingly reduced. Therefore, the measured FBG wavelength drift $\Delta\lambda_M$ can be obtained through the change of light energy, and then the drift can be demodulated to achieve the micro-displacement measurement. As the ambient temperature changes (for example, $\Delta T>0$), the two FBGs in the same temperature field will produce equal center wavelength drifts $\Delta\lambda_T$ approximately in the same direction, so the overlapping area of their reflection spectra remains approximately constant ($S_2=S_0$), as shown in (c) of FIG. 2. In the actual micro-displacement measurement process (for example, $\Delta T>0$ and $\varepsilon_x<0$), the center wavelength drifts of the measured FBG and demodulated FBG respectively are $\Delta\lambda_T+\Delta\lambda_x$ and $\Delta\lambda_T$, the wavelength difference is still $\Delta\lambda_x+\lambda_0$, and the spectral overlapping area $S_3=S_1$, as shown in (d) of FIG. 2. That is, while the micro-displacement is measured in the probe system, low-cost and high-reliability temperature error self-compensation is also achieved, so that the sensor module at the forefront of the signal transmission chain has almost no temperature error influence. In addition, the structure exhibits good robustness against other common-mode interferences such as vibration and airflow interferences.

The demodulation optical path module includes: an ASE broadband light source 5, a first circulator 6, a second circulator 7, and an InGaAs photodetector 8.

An input end of the first circulator 6 is connected to the ASE broadband light source 5, and an output end of the first circulator 6 is connected to the measurement FBG sensor 1.

An input end of the second circulator 7 is connected to a reflection end of the first circulator 6, and an output end of the second circulator 7 is connected to the matching FBG sensor 2. A reflection end of the second circulator 7 is connected to an input end of the InGaAs photodetector 8. In this embodiment, the output wavelength of the ASE broadband light source is 1525-1570 nm, and the output power is at the mW level. The first circulator and the second circulator are both 1×2 type circulators and have operating wavelengths of 1550 nm, insertion loss of 0.80 dB and 0.63 dB respectively, and return loss≥55 dB. The InGaAs photodetector has a wavelength response range of 1100-1700 nm, a responsivity of 10 A/W, a conversion gain of $1.6 \times 10^4$, and a saturated optical power of −20 dBm.

An output end of the InGaAs photodetector 8 is connected to the static lock-in amplification module. In this embodiment, the static lock-in amplification module mainly performs bias elimination, filtering, modulation and demodulation, and other processing on the optical power voltage signal outputted by the photodetector. Through the static lock-in amplification technology, the noise of the input channel can be significantly reduced, and a static weak signal can be detected and processed from the noisy environment and amplified to an effective scale. Therefore, the sensitivity of the measurement system is increased and the signal-to-noise ratio is improved, and the micro-displacement measurement resolution of the micro-nano test system is further improved.

The upper computer module includes: a data acquisition card 10 and a computer 11, and the data acquisition card is USB-6120 (16-bit, 250 kS/s).

An output of the static lock-in amplification module is transmitted to the computer 11 through the data acquisition card 10.

The micro-displacement drive module includes a piezoelectric ceramic nano-positioner 12, a piezoelectric ceramic driver 13, and a three-dimensional precision micro-motion platform 14. In this embodiment, the piezoelectric ceramic nano-positioner 12 has a closed-loop stroke of 2 μm, a repeatability of 0.7 nm, and a resolution of 0.03 nm.

An input end of the piezoelectric ceramic driver 13 is connected to the computer 11, and an output end of the piezoelectric ceramic driver 13 is connected to the piezoelectric ceramic nano-positioner 12. The piezoelectric ceramic nano-positioner 12 is fixed onto the three-dimensional precision micro-motion platform 14.

Figure 3:
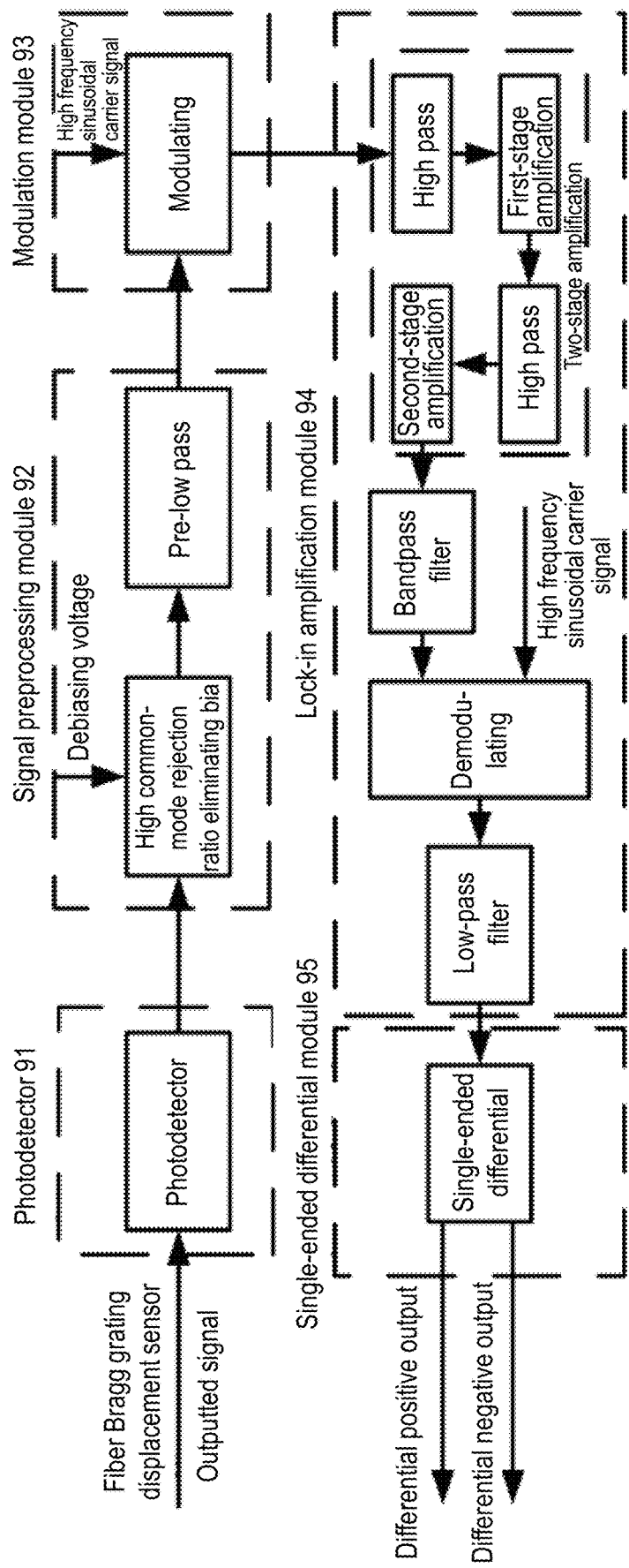
FIG. 3 is a schematic structural diagram of a static lock-in amplification module.

The static lock-in amplification technology included in the system can extract a weak direct current signal under strong noise background interference and amplify and output the direct current effective signal at a high rate to improve the signal-to-noise ratio of the output signal. As shown in FIG. 3, the static lock-in amplification module 9 is formed of five parts, including: a photodetector 91, a signal preprocessing module 92, a modulation module 93, a lock-in amplification module 94, and a single-ended differential module 95. The photodetector detects the displacement variation of the fiber Bragg grating and converts it into a weak electrical signal and sends it to the signal preprocessing module. The signal preprocessing module filters the weak electrical signal and eliminates the bias, obtains a signal to be modulated that meets the modulation requirements, and then sends it to the modulation module.

The modulation module performs amplitude modulation on the signal to be modulated and a high-frequency sinusoidal carrier signal, and then sends the signals to the lock-in amplification module. The modulated signal is subjected to two-stage amplification and band-pass filter processing by the lock-in amplification module, and then demodulated and low-pass filter processed together with another phase-shifted high-frequency sinusoidal carrier signal received. An effective direct current signal to be tested is obtained and outputted to the single-ended differential module. The effective direct signal to be tested is amplified by the single-ended differential module, and that an effective direct current differential electrical signal is obtained.

The basic principle of the static lock-in amplification module provided by the disclosure is as follows:

When the input signal contains noise, let the input signal be:

$$x(t) = \nabla_s \cos(\omega_1 t + \theta_1) + \nabla_n \cos(\omega t) \quad (4)$$

In formula (4), $V_s$ represents the amplitude of the weak periodic signal, $\omega_1$ represents the frequency of the weak periodic signal, and $\theta_1$ represents the initial phase of the weak periodic signal. $V_n$ represents the amplitude of the noise signal, $\omega$ represents the frequency of the noise signal, t is the time, and x(t) is the input signal.

The reference signal is:

$$r(t) = V_r \cos(\omega_2 t + \theta_2) \quad (5)$$

In formula (5), r(t) is the reference signal, $\omega_2$ is the frequency of the reference signal, $\theta_2$ is the initial phase angle of the reference signal, and $V_r$ is the amplitude of the reference signal.

Then the output is:

$$u(t) = x(t) \cdot r(t) = [\nabla_s \cos(\omega_1 t + \theta_1) + \nabla_n \cos(\omega t)] \cdot \nabla_r \cos(\omega_2 t + \theta_2) = \quad (6)$$
$$0.5\nabla_s \nabla_r \cos[(\omega_1 + \omega_2)t + (\theta_1 + \theta_2)] +$$
$$0.5\nabla_s \nabla_r \cos[(\omega_1 - \omega_2)t + (\theta_1 - \theta_2)] +$$
$$0.5 V_s V_n \cos[(\omega_2 + \omega)t + \theta_2] + 0.5 V_s V_n \cos[(\omega_2 - \omega)t + \theta_2]$$

After passing through a low-pass filter, the combined frequency of the first and third terms of formula (6) is filtered out, leaving only the second and fourth terms. Since the frequency ω of the noise is random, the frequency of the noise and the frequency of the input signal are rarely the same frequency, it can basically be filtered out, so the output result is U(t)=$0.5V_s V_r \cos(\Delta\omega t+\Delta\theta)$, $\Delta\omega=\omega_1-\omega_2$ and $\Delta\theta=\theta_1-\theta_2$, which is consistent with the result without noise. It thus can be seen that the input signal with the same frequency and phase as the reference signal can be extracted from the noise in the correlation detection.

In the same way, it can be proved that when r(t) is a square wave, after passing through the low-pass filter, the output at this time is:

$$U(t) = \frac{2\nabla_s V_r}{\pi} \cos\Delta\theta \quad (7)$$

In the same way, the input square wave can extract the signal to be tested at the same frequency as the carrier signal, and at the same time filter out other frequency noises.

The circuit parameters are set as follows: the pre-low-pass filter module selects a second-order fourth-order Butterworth low-pass filter as the circuit structure, the cut-off frequency is designed to be 10 Hz, and the amplitude-frequency characteristic is designed to reach −40 dB at 50 Hz (that is, cut 100 times). The modulation module gain is 1. The band-pass filter module adopts Butterworth's second-stage fourth-order filter, the passband center frequency is 1 KHz, the passband is 30 Hz, and the gain is 1.3. The demodulation module gain is 1. The low-pass filter module uses a second-stage fourth-order Butterworth filter with a cutoff frequency of 1 Hz. In the actual experiment, the amplitude of the high-frequency sinusoidal carrier signal sent to the modulation module and the demodulation module by the external signal generator is 500 mV, and the frequency is 1 KHz.

Further, according to the formula: voltage resolution=noise/magnification, it can be seen that the resolution of the static lock-in amplification circuit system to the input weak voltage is approximately 6 μV, which shows that the system has a high signal-to-noise ratio for static signals.

Figure 4:
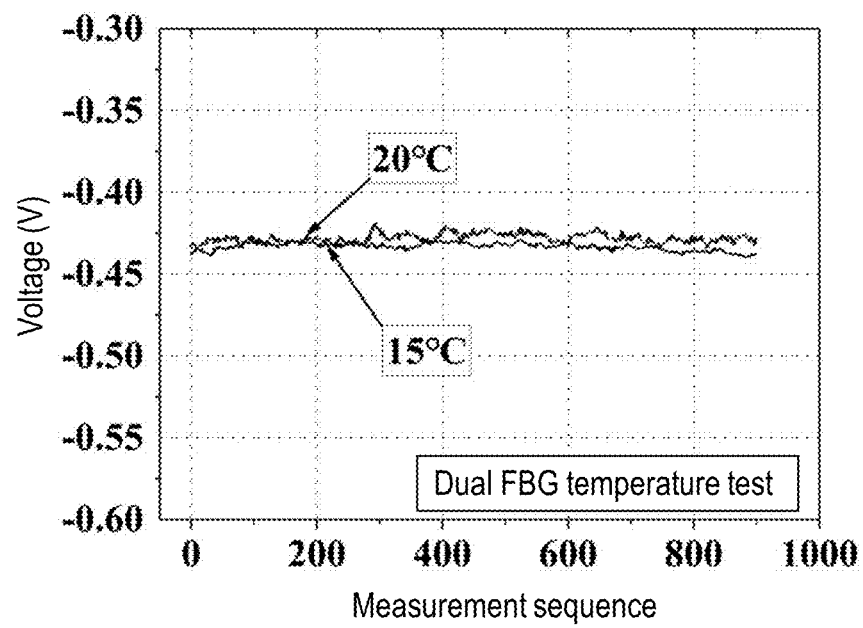
FIG. 4 is a graph of dual FBG temperature test results.
Figure 5:
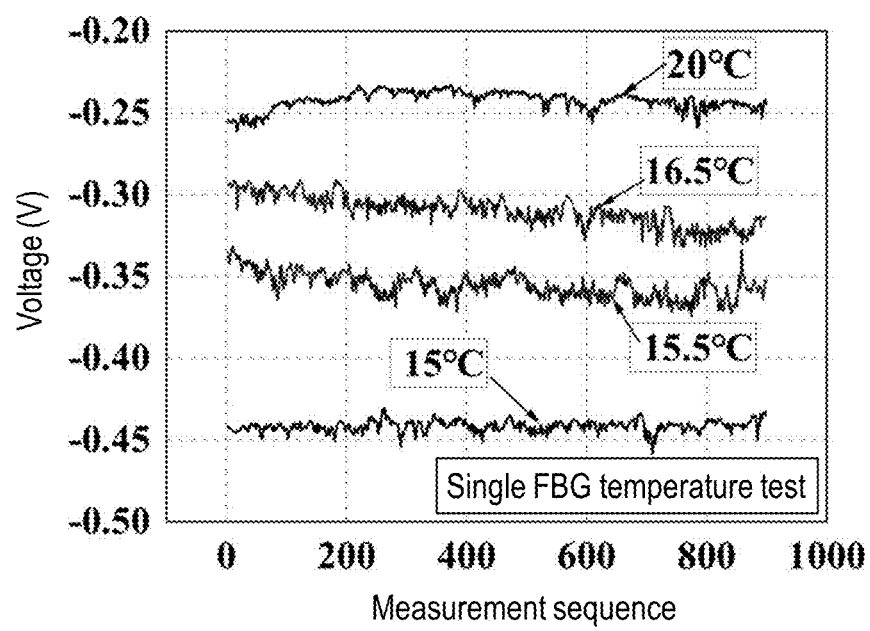
FIG. 5 is a graph of single FBG temperature test results.

The dual FBG self-compensating demodulation structure and the common single FBG probe structure used for the control experiment are put into the water bath box, and the temperature control accuracy of the water bath box is ±0.1° C. FIG. 4 is a graph of the dual FBG temperature test results. After the temperature of the water bath rises from 15° C. to 20° C., the average output values of the InGaAs photodetector respectively are −0.433V and −0.428V and the measurement standard deviations respectively are 2.293 mV and 2.707 mV, and the output voltage drifts by 5.345 mV as the temperature rises. FIG. 5 is a graph of the single FBG temperature test results. Under the conditions of 15° C. and 20° C., the average values of the output signal respectively are −0.442V and −0.242V, and the standard deviations respectively are 3.447 mV and 5.585 mV. The output signal of the common single FBG probe structure drifts by 199.190 mV, which is approximately 40 times that of the dual FBG self-compensating structure. Therefore, it can be seen that the dual FBG self-compensating demodulation system structure can significantly reduce the impact of ambient temperature changes on the measurement.

Figure 6:
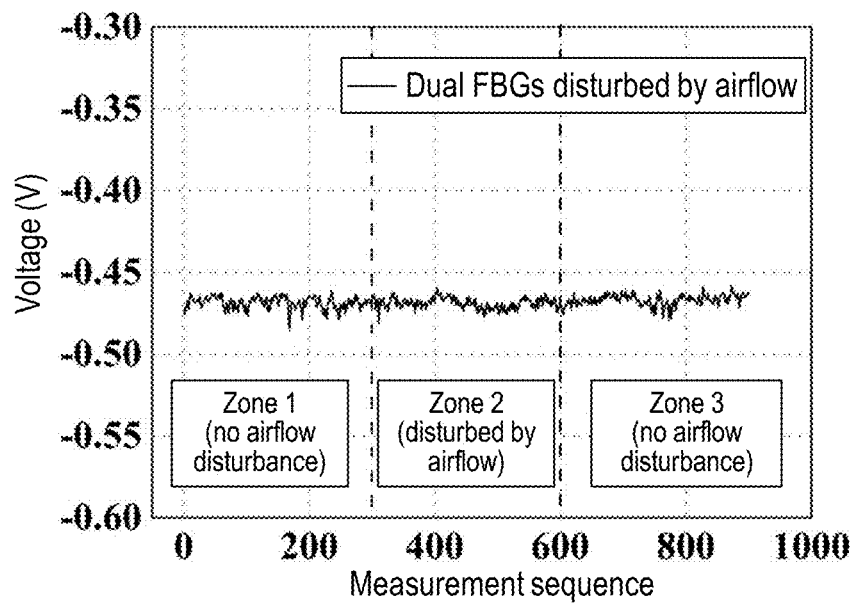
FIG. 6 is a graph of experimental results of the dual FBG being disturbed by airflow.
Figure 7:
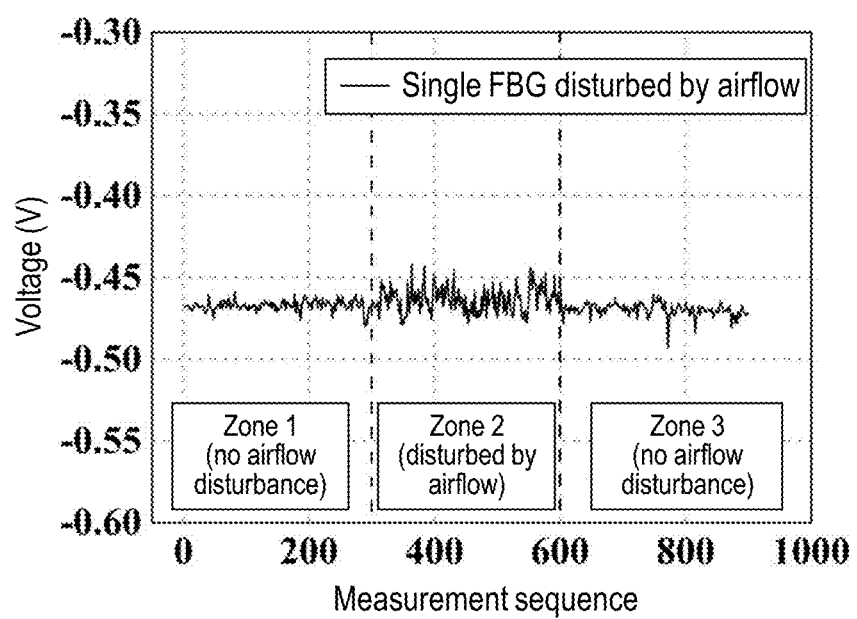
FIG. 7 is a graph of experimental results of the single FBG being disturbed by airflow.

FIG. 6 is a graph of experimental results of the dual FBG being disturbed by airflow. FIG. 7 is a graph of experimental results of the single FBG being disturbed by airflow. Airflow interference is loaded in zone 2, and in zone 1 and zone 3 there is no airflow disturbance. Regarding the experimental curves of the dual FBG self-compensating demodulation system in zone 2, the average value and standard deviation of which are −0.469V and 4.489 mV, respectively. The average value and standard deviation of the common single FBG probe structure in zone 2 are −0.456V and 3.231 mV, respectively. The results show that the dual FBG self-compensating demodulation system has significantly smaller drift and noise fluctuation than the common single FBG probe structure when subjected to the same airflow disturbance. It thus can be seen that the dual FBG self-compensating demodulation structure exhibits good robustness against common-mode interference such as temperature changes and airflow disturbances.

In this embodiment, a measurement method of the micro-displacement measurement system having the picometer scale resolution is provided, and the measurement method is implemented according to the following steps.

In step 1, the ASE broadband light source 5 is preheated, and the piezoelectric ceramic nano-positioner 12 is adjusted, so that an upper end surface of the piezoelectric ceramic nano-positioner 12 is aligned with a top portion of the measurement FBG sensor 1.

In step 2, the measurement FBG sensor 1 is fixed, a step amount of the three-dimensional precision micro-motion platform 14 is adjusted to a micron scale, the three-dimensional precision micro-motion platform 14 gradually approaches the top portion of the measurement FBG sensor 1 according to the step amount, and the adjustment of the three-dimensional precision micro-motion platform 14 is stopped when a distance between the two enters a full-scale range of measurement.

In step 3, the computer 11 controls the piezoelectric ceramic driver 13 to continuously output piezoelectric signals to drive the piezoelectric ceramic nano-positioner 12 to step according to a nanoscale step amount, where in the stepping process, the top portion of the measurement FBG sensor 1 is in contact with the upper end surface of the piezoelectric ceramic nano-positioner 12 step by step, so that the optical power voltage signal outputted by the InGaAs photodetector 8 continues to produce corresponding changes, and the data acquisition card 10 synchronously collects the optical power voltage signal processed by the static lock-in amplification module and transmits it to the computer 11.

In step 4, the computer 11 performs averaging and least square fitting processing on the received processed optical power voltage signals in the stepping process, a piezoelectric ceramic nano-positioner output displacement curve is established, and the measurement of micro-displacement is completed.

Figure 8:
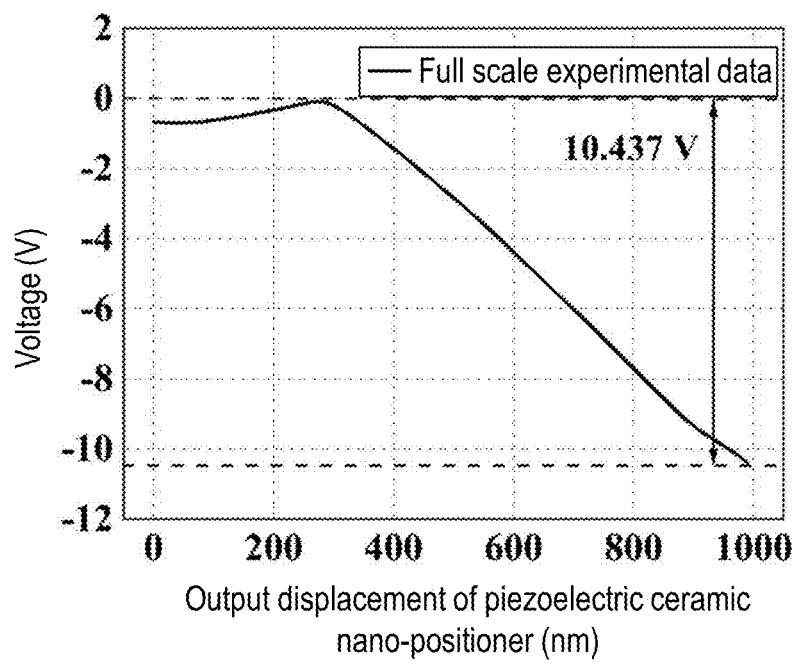
FIG. 8 is a graph of results of a full-scale data fitting curve.
Figure 9:
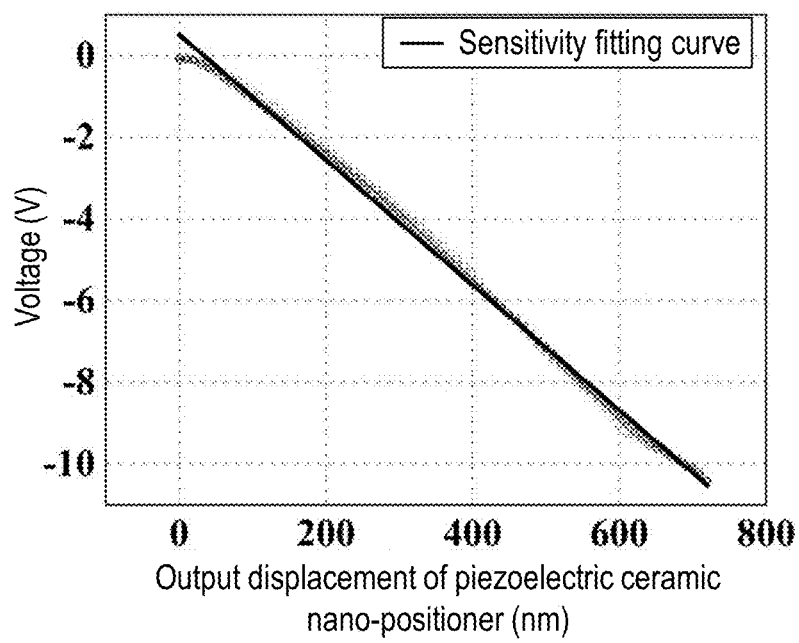
FIG. 9 is a graph of results of a fitting sensitivity curve.

In this embodiment, after the top portion of the measurement FBG sensor is in contact with the upper surface of the piezoelectric ceramic nano-positioner, the piezoelectric ceramic nano-positioner works in a closed-loop mode. The micro-displacement is outputted with a step of 10 nm, and 500 data are sampled at each displacement point, and the average value is treated as the measurement data of the displacement point. In a complete full-scale test, several displacement measurement points can be obtained. FIG. 9 is a full-scale data fitting curve. As shown in FIG. 8, the output voltage range is 10.437V. Five sets of repeated experiments are then carried out, and the piezoelectric ceramic nano-positioner is allowed to step and output the same displacement and record the corresponding voltage signals. As shown in FIG. 9, a sensitivity curve is fitted from the obtained data. The fitted sensitivity curve formula is:

$$U = -0.01533x + 0.51671 \qquad (8)$$

In the above formula: U is the collected voltage signal, and x is the output displacement of the corresponding piezoelectric ceramic nano-positioner. It can be seen that the slope of the sensitivity curve is −15.330 mV/nm, and the nonlinear error is 5.811%.

Figure 10:
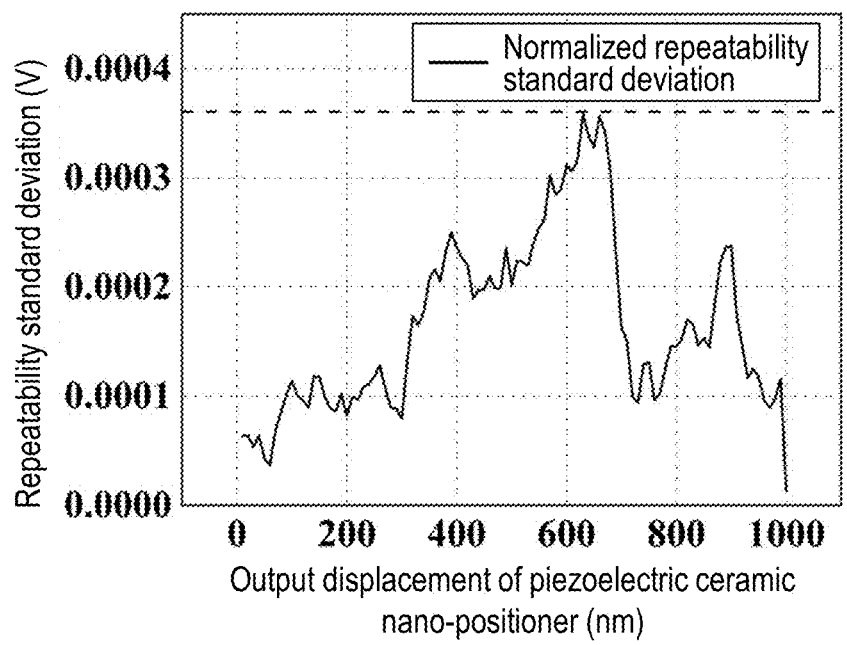
FIG. 10 is a graph of results of a repeatability standard deviation.

FIG. 10 is the repeatability standard deviation calculated for five sets of repeatability experiments. The results show that the maximum normalized repeatability standard deviation is 0.356 mV.

Figure 11:
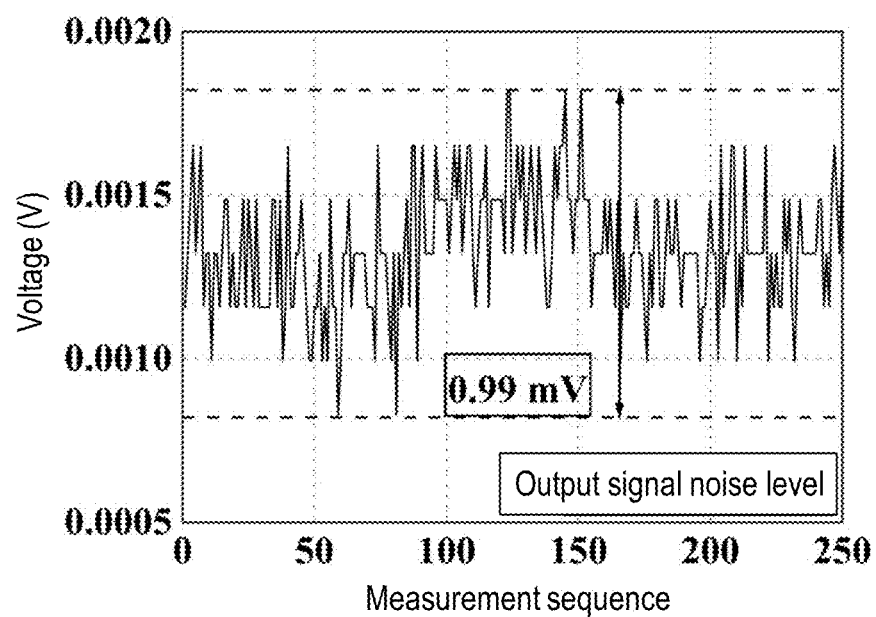
FIG. 11 is a graph of results of noise level measurement.

FIG. 11 is a graph of the results of noise level measurement. As shown in the figure, the maximum noise during the period (1S) is approximately 0.990 mV. The formula for calculating resolution is:

$$S = \frac{N}{K} \quad (9)$$

In the above formula: S is the resolution, N is the maximum noise level, and K is the slope of the sensitivity curve. From the above, it can be calculated that the resolution of the measurement system is 0.646 nm (64.6 pm).

In view of the foregoing, through the micro-displacement measurement system having the picometer scale resolution and the measurement method thereof, the optical power voltage signal following the micro-displacement change can be reliably obtained, and the voltage-output displacement curve of the piezoelectric ceramic nano-positioner is established. The recognition and detection of the micro-displacement smaller than the nanometer scale is achieved, and the work is stable and the performance is good. In order to improve the reliability of the micro-nano measurement system, the correction and optimization of the system structure play a key role. Further, a theoretical basis and technical support are provided for guiding the design of micro-nano measurement and instrument systems.

What is claimed is:

1. A micro-displacement measurement system having a picometer scale resolution, comprising a probe module, a demodulation optical path module, a static lock-in amplification module, an upper computer module, and a micro-displacement drive module, wherein
    the probe module comprises: a measurement fiber Bragg grating (FBG) sensor, a matching FBG sensor, a precision stainless steel needle tube, and an external support,
    the precision stainless steel needle tube is clamped on the external support, the measurement FBG sensor and the matching FBG sensor are packaged side by side in the precision stainless steel needle tube, a distance from a fiber end surface of the measurement FBG sensor to a bottom portion of the precision stainless steel needle tube is less than a distance from a fiber end surface of the matching FBG sensor to the bottom portion of the precision stainless steel needle tube, so that a dual FBG self-compensating demodulation structure is formed, the measurement FBG sensor and the matching FBG sensor are both single-mode FBGs and have Bragg center wavelengths of 1549.949 nm and 1549.963 nm respectively, 3 dB bandwidths of 0.134 nm and 0.132 nm respectively, and grating lengths of 15 mm, a difference between the Bragg center wavelengths of the two FBGs is 0.014 nm,
    the demodulation optical path module comprises: an amplified spontaneous emission (ASE) broadband light source, a first circulator, a second circulator, and an InGaAs photodetector,
    the probe module is put into a water bath box, after a temperature of a water bath rises from 15° C. to 20° C., average output values of the InGaAs photodetector respectively are −0.433V and −0.428V, measurement standard deviations respectively are 2.293 mV and 2.707 mV, and an output voltage drift by 5.345 mV as the temperature rises,
    an input end of the first circulator is connected to the ASE broadband light source, an output end of the first circulator is connected to the measurement FBG sensor, an input end of the second circulator is connected to a reflection end of the first circulator, an output end of the second circulator is connected to the matching FBG sensor, a reflection end of the second circulator is connected to an input end of the InGaAs photodetector, the first circulator and the second circulator are both 1×2 circulators and have operating wavelengths of 1550 nm, insertion loss of 0.80 dB and 0.63 dB respectively, and return loss≥55 dB,
    an output end of the InGaAs photodetector is connected to the static lock-in amplification module,
    the upper computer module comprises: a data acquisition card and a computer,
    an output signal of the static lock-in amplification module is transmitted to the computer through the data acquisition card,
    the micro-displacement drive module comprises a piezoelectric ceramic nano-positioner, a piezoelectric ceramic driver, and a three-dimensional precision micro-motion platform, the piezoelectric ceramic nano-positioner has a closed-loop stroke of 2 µm, a repeatability of 0.7 nm, and a resolution of 0.03 nm,
    an input end of the piezoelectric ceramic driver is connected to the computer, an output end of the piezoelectric ceramic driver is connected to the piezoelectric ceramic nano-positioner, the piezoelectric ceramic nano-positioner is fixed onto the three-dimensional precision micro-motion platform, and
    laser light emitted by the ASE broadband light source is transmitted into the measurement FBG sensor through the first circulator, first reflected light after the measurement FBG sensor reflects the laser light reaches the input end of the second circulator and is transmitted into the matching FBG sensor by the second circulator, second reflected light after the matching FBG sensor reflects the first reflected light enters the InGaAs photodetector, and an optical power voltage signal is outputted by the InGaAs photodetector, transmitted to the static lock-in amplification module for processing, and then transmitted into the computer through the data acquisition card, wherein the optical power voltage signal is proportional to a spectral overlapping area of the measurement FBG sensor and the matching FBG sensor.

2. A measurement method of the micro-displacement measurement system having the picometer scale resolution according to claim 1, comprising:
    step 1: preheating the ASE broadband light source and adjusting the piezoelectric ceramic nano-positioner, so that an upper end surface of the piezoelectric ceramic nano-positioner is aligned with a top portion of the measurement FBG sensor;
    step 2: fixing the measurement FBG sensor, adjusting a step amount of the three-dimensional precision micro-motion platform to a micron scale, the three-dimensional precision micro-motion platform gradually approaching the top portion of the measurement FBG sensor according to the step amount, and stopping the adjustment of the three-dimensional precision micro-motion platform when a distance between the measurement FBG sensor and the three-dimensional precision micro-motion platform enters a full-scale range of measurement;
    step 3: controlling, by the computer, the piezoelectric ceramic driver to continuously output piezoelectric signals to drive the piezoelectric ceramic nano-positioner to step according to a nanoscale step amount, wherein in a stepping process, the top portion of the measurement FBG sensor is in contact with the upper end surface of the piezoelectric ceramic nano-positioner step by step, so that the optical power voltage signal outputted by the InGaAs photodetector continues to produce corresponding changes, and the data acquisition card synchronously collects the optical power voltage signal processed by the static lock-in amplification module and transmits it to the computer; and step 4: performing, by the computer averaging and least square fitting processing on the received processed optical power voltage signal in the stepping process, establishing a piezoelectric ceramic nano-positioner output displacement curve, and completing the measurement of micro-displacement.

\* \* \* \* \*